(12) United States Patent
Lee et al.

(10) Patent No.: US 9,136,507 B2
(45) Date of Patent: Sep. 15, 2015

(54) CAN AND LITHIUM SECONDARY BATTERY USING THE SAME

(75) Inventors: Sang-Woo Lee, Yongin-si (KR); Min-Ho Song, Yongin-si (KR); Kwang-Su Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 2149 days.

(21) Appl. No.: 11/387,102

(22) Filed: Mar. 23, 2006

(65) Prior Publication Data
US 2007/0145098 A1    Jun. 28, 2007

(30) Foreign Application Priority Data

Mar. 24, 2005   (KR) .......................... 10-2005-0024670
Apr. 25, 2005   (KR) .......................... 10-2005-0034228

(51) Int. Cl.
| H01M 6/12 | (2006.01) |
| H01M 2/02 | (2006.01) |
| H01M 10/058 | (2010.01) |
| H01M 10/052 | (2010.01) |

(52) U.S. Cl.
CPC .............. *H01M 2/02* (2013.01); *H01M 10/058* (2013.01); *H01M 2/0217* (2013.01); *H01M 10/052* (2013.01)

(58) Field of Classification Search
CPC ... H01M 2/02; H01M 2/0217; H01M 10/052; H01M 10/058
USPC .......................................... 429/186; 228/101
See application file for complete search history.

(56) References Cited

U.S. PATENT DOCUMENTS

| 5,510,203 A * | 4/1996 | Hamada et al. ................. 429/53 |
| 5,686,202 A * | 11/1997 | Hooke et al. ................... 429/160 |
| 6,159,631 A * | 12/2000 | Thompson et al. ............. 429/82 |
| 6,267,790 B1 * | 7/2001 | Daroux et al. ................ 29/623.2 |
| 2003/0031920 A1 * | 2/2003 | Hoffman et al. ................ 429/66 |
| 2003/0077505 A1 * | 4/2003 | Goda et al. ....................... 429/56 |
| 2005/0029985 A1 * | 2/2005 | Hano et al. ..................... 320/112 |
| 2012/0295152 A1 * | 11/2012 | Takeshita et al. ............. 429/178 |

FOREIGN PATENT DOCUMENTS

| JP | 63-250049 | 10/1988 |
| JP | 2003-217527 | * 7/2003 ............. H01M 2/02 |
| KR | 1997-54691 | 7/1997 |

OTHER PUBLICATIONS

Hanabusa, JP2003-217527, English Abstract and Figure 1, Jul. 31, 2003.*

* cited by examiner

*Primary Examiner* — Patrick Ryan
*Assistant Examiner* — Jose Colucci Rios
(74) *Attorney, Agent, or Firm* — Robert E. Bushnell, Esq.

(57) ABSTRACT

A can for a lithium secondary battery and a lithium secondary battery using the same, where guide slots are formed in a bottom wall and a sidewall of the can of the lithium secondary battery so that the can is symmetrically bent about a longitudinal axis thereof when the lithium secondary battery is compressed in a direction orthogonal to the longitudinal axis, thus preventing a short circuit from occurring between electrode plates of the of the electrode assembly located within the can resulting in improved safety of the lithium secondary battery. Alternatively, embossing portions are formed in a bottom wall of the can for the lithium secondary battery while protruding toward an inner portion of the can, so that the bottom wall of the can is outwardly bent when the lithium secondary battery is subject to compression in a direction orthogonal to the longitudinal axis, resulting in improved safety of the lithium secondary battery.

42 Claims, 14 Drawing Sheets

CAN AND LITHIUM SECONDARY BATTERY USING THE SAME

CLAIM OF PRIORITY

This application makes reference to, incorporates the same herein, and claims all benefits accruing under 35 U.S.C. §119 from applications entitled CAN AND LITHIUM SECONDARY BATTERY USING THE SAME, earlier filed in the Korean Intellectual Property Office on 24 Mar., 2005 and there duly assigned Serial No. 10-2005-0024670 and on 25 Apr., 2005 and there duly assigned Serial No. 10-2005-0034228, respectively.

BACKGROUND OF THE INVENTION

1. Field of the Invention

The present invention relates to a can and a lithium secondary battery using the same. More particularly, the present invention relates to a can and a lithium secondary battery using the same, where guide slots are formed in a bottom wall and a sidewall of the can of the lithium secondary battery so that the can be symmetrically bent about a longitudinal axis thereof when the lithium secondary battery is compressed in a direction orthogonal to the longitudinal axis, thus preventing a short circuit from occurring between electrode plates leading to improved safety of the lithium secondary battery.

In addition, the present invention relates to a can and a lithium secondary battery using the same, where embossing portions are formed in a bottom wall of the can of the lithium secondary battery while protruding toward an inner portion of the can, so that the bottom wall of the can is outwardly bent when the lithium secondary battery is compressed in a direction orthogonal to the longitudinal axis of the can, leading to improved safety of the lithium secondary battery.

2. Description of the Prior Art

Recently, portable wireless appliances, such as video cameras, portable phones and portable computers, have been fabricated to be light-weight and equipped with various functions. As a result, studies have been actively performed in relation to secondary batteries used as power sources for these portable wireless appliances. For instance, the secondary batteries include Ni—Cd batteries, Ni—MH batteries, Ni—Zn batteries and lithium secondary batteries. Among other things, the lithium secondary batteries are rechargeable batteries, which can be fabricated to have a compact size with high capacity. The lithium secondary batteries represent high operational voltage and high energy density per unit weight, allowing the lithium secondary batteries to be extensively used in the advanced electronic technology fields.

A lithium secondary battery can be obtained by accommodating an electrode assembly, that includes a positive electrode plate, a negative electrode plate and a separator, into a can together with an electrolyte, and then sealing an upper opening of the can using a cap assembly. In general, the can is made out of aluminum or an aluminum alloy through a deep drawing process. In addition, a lower surface of the can is substantially planarized.

The electrode assembly is formed by winding the positive electrode plate together with the negative electrode plate while interposing the separator therebetween. A positive electrode tap is coupled to the positive electrode plate and an end portion of the positive electrode tap protrudes upward from the electrode assembly. A negative electrode tap is coupled to the negative electrode plate and an end portion of the negative electrode tap also protrudes upward from the electrode assembly. The positive electrode tap is spaced apart from the negative electrode tap by a predetermined distance so that the positive electrode tap can be electrically insulated from the negative electrode tap. In general, the positive and negative electrode taps are made out of nickel.

The cap assembly includes a cap plate, an insulating plate, a terminal plate and an electrode terminal. The cap assembly fits within an insulating case and is assembled to the upper opening of the can, thus sealing the can. The cap plate is made out of a metal plate having a size and a shape corresponding to that of the upper opening of the can. The cap plate is located at the center of upper opening and is perforated by a first terminal hole which accommodates the electrode terminal. When the electrode terminal is inserted into the first terminal hole, a gasket tube is fitted around the electrode terminal in order to insulate the electrode terminal from the cap plate. The electrode terminal is connected to the negative electrode tap of the negative electrode plate or the positive electrode tap of the positive electrode plate so that the electrode terminal can serve as a negative electrode terminal or a positive electrode terminal. An electrolyte injection hole having a predetermined size is located at one side of the cap plate. After the cap assembly has been assembled to the upper opening of the can, the electrolyte is injected into the can through the electrolyte injection hole. Then, the electrolyte injection hole is sealed by a plug.

The insulating plate is made out of an insulating material identical to the material used for the gasket and is coupled with the lower surface of the cap plate. The insulating plate is perforated by a second terminal hole that is aligned to the first terminal hole of the cap plate and into which the electrode terminal is inserted. The insulating plate is formed on the lower surface of the cap plate and has a resting recess having a size and a shape corresponding to that of the terminal plate so that the terminal plate can be rested in the resting recess.

The terminal plate is made out of a Ni alloy and is coupled with the lower surface of the insulating plate. The terminal plate is perforated by a third terminal hole that is aligned to the first terminal hole of the cap plate and into which the electrode terminal is inserted. Since the electrode terminal inserted into the first terminal hole of the cap plate is insulated from the terminal plate by means of the gasket tube, the terminal plate can be electrically connected to the electrode terminal while being electrically insulated from the cap plate.

Meanwhile, the negative electrode tap coupled to the negative electrode plate is welded to one side of the terminal plate and the positive electrode tap coupled to the positive electrode plate is welded to other side of the cap plate. The negative and positive electrode taps are welded to the terminal plate and the cap plate through resistance welding or laser welding. Of these, the resistance welding is preferred.

Recently, as the energy density of the lithium secondary battery has increased, the lithium secondary battery has become smaller in size, causing the lithium secondary battery to becomes more vulnerable to damage from impact and compression. Accordingly, when the lithium secondary battery is subject to such impact and compression, the electrode assembly within the can becomes deformed, causing a short circuit to be generated between electrode terminals, leading to accidental ignition or explosion of the lithium secondary battery.

In particular, when the lithium secondary battery is deformed about a longitudinal axis by longitudinal compression force applied thereto during a longitudinal compression test, which is one of safety tests for the lithium secondary battery, the can is completely compressed without forming a predetermined regular shape. Thus, irregular pressure is locally applied to the electrode assembly within the can, so that short circuiting can occur between electrode plates of the electrode assembly, causing accidental ignition or explosion of the lithium secondary battery. Therefore, what is needed is an improved design for the can and for the lithium battery where the electrode assembly is less apt to be damaged by impact and compression.

SUMMARY OF THE INVENTION

It is therefore an object of the present invention to provide for an improved design for a can that can be used in a lithium secondary battery.

It is also an object of the present invention to provide a lithium secondary battery employing the novel can.

It is further an object of the present invention to provide a can and a compact lithium secondary battery employing the can where the can is designed to prevent damage to an electrode assembly within when subjected to compressive forces.

Accordingly, the present invention has been made to solve the above-mentioned problems, and an object of the present invention is to provide a can and a lithium secondary battery using the same, where guide slots are formed in a bottom wall and a sidewall of the can of the lithium secondary battery so that the can is symmetrically bent about a longitudinal axis thereof when the lithium secondary battery is compressed in a direction orthogonal to the longitudinal axis, thus preventing a short circuit from occurring between electrode plates leading to improved safety for the lithium secondary battery.

Another object of the present invention is to provide a can and a lithium secondary battery using the same, where embossing portions are formed in a bottom wall of the can of the lithium secondary battery while protruding toward an inner portion of the can, so that the bottom wall of the can be outwardly bent when the lithium secondary battery is subjected to compressive forces in a direction orthogonal to the longitudinal axis, leading to improved safety for the lithium secondary battery.

According to one aspect of the present invention, there is provided a can that includes a bottom wall arranged opposite from an upper opening, wherein a first guide slot is arranged in the bottom wall at both sides of the bottom wall of the can and extending orthogonal to a longitudinal direction of the bottom wall, the can being adapted to accommodate an electrode assembly, the electrode assembly includes a positive electrode plate, a negative electrode plate and a separator arranged between the positive and negative electrode plates, the can being further adapted to accommodate insertion of the electrode assembly into the can via the upper opening.

The can may further include a pair of long-sidewalls and a pair of short-sidewalls arranged between the bottom wall and the upper opening, the can being of a box shape. The can may alternatively include a pair of long-sidewalls and a pair of short-sidewalls arranged between the bottom wall and the upper opening, wherein the short-sidewalls of the can are curved, the can having an oval cross section. Each first guide slot can have a bar shape. Each first guide slot can have a cross section selected from the group consisting of arcuate, rectangular and triangular. Each first guide slot can have a length of at least 25% of a width of the bottom wall. Each first guide slot can have a width of less than 3 mm. The width of each first guide slot can be less than 1 mm. Each first guide slot can have a depth of less than 25% of a thickness of the bottom wall. The depth of each first guide slot can be less than 10% of the thickness of the bottom wall. Each first guide slot can be arranged in an outer surface of the bottom wall of the can. Each first guide slot can extend from one of a front end and a rear end of the bottom wall of the can and be recessed in an outer surface of the bottom wall of the can. Each first guide slot can be arranged in an inner surface of the can. Each first guide slot can extend from one of the long-sidewalls of the can and along the bottom wall. A distance between each first guide slots and a closest lateral side of the bottom wall is no more than 25% of a length of the bottom wall. The distance between each first guide slot and a closest lateral side of the bottom wall can be within 10% of the length of the bottom wall.

The can also include a second guide slot longitudinally arranged at a center portion of one of the long-sidewalls. The second guide slot can have a bar shape. The second guide slot can have a cross sectional shape such as an arcuate shape, a rectangular shape and a triangular shape. The second guide slot can have a length of at least 50% of a height of a long-sidewall that the second guide slot is arranged in. The second guide slot can have a width of less than 3 mm. The width of the second guide slot can be less than 1 mm. The second guide slot can have a depth less than 25% of a thickness of a long-sidewall that the second guide slot is arranged in. The depth of the second guide slot can be less than 10% of the thickness of the long-sidewall that the second guide slot is arranged in.

According to another aspect of the present invention, there is provided a lithium secondary battery that includes an electrode assembly including a positive electrode plate, a negative electrode plate and a separator arranged between the positive and negative electrode plates and a can comprising a bottom wall arranged opposite from an upper opening, wherein a first guide slot is arranged in the bottom wall at both sides of the bottom wall of the can and extending orthogonal to a longitudinal direction of the bottom wall, the can being adapted to accommodate the electrode assembly, the can being further adapted to accommodate insertion of the electrode assembly into the can via the upper opening arranged, the electrode assembly being arranged within the can.

Each first guide slot can have a width of less than 3 mm. The battery can further include a long sidewall arranged between the bottom wall and the upper opening and a second guide slot arranged in the long sidewall and being longitudinally arranged at a center portion of the long-sidewall of the can. The second guide slot can have a width of less than 3 mm.

According to yet another aspect of the present invention, there is provided a can that includes a bottom wall arranged opposite from an upper opening, wherein an embossing portion is arranged in the bottom wall at both sides of the bottom wall of the can, each embossing portion protruding inward toward an inner portion of the can, the can being adapted to accommodate an electrode assembly that includes a positive electrode plate, a negative electrode plate and a separator arranged between the positive and negative electrode plates, the can being further adapted to accommodate insertion of the electrode assembly into the can via the upper opening.

The can further include a pair of long-sidewalls and a pair of short-sidewalls arranged between the bottom wall and the upper opening, the can being of a box shape. The can further include a pair of long-sidewalls and a pair of short-sidewalls arranged between the bottom wall and the upper opening, wherein the short-sidewalls of the can are curved, the can having an oval cross section. Each embossing portion can have a shape selected from the group consisting of a bar, conical and hemispherical. Each embossing portion can be spaced apart from a closest lateral side of the bottom wall and be aligned to be parallel to the closest lateral side of the bottom wall. A distance between one of the embossing portions and a closest lateral side of the bottom wall can be no more than 25% of a length of the bottom wall. A distance between one of the embossing portions and a closest lateral side of the bottom wall can be no more than 10% of a length of the bottom wall. Each embossing portion can be arranged in an area corresponding to at least 50% of a length of the lateral side of the bottom wall. The embossing portions together can be arranged as a single closed-loop shape in the bottom wall. The embossing portions together can be arranged as one of a rectangular ring shape and an oval ring shape. The embossing portions can be arranged within an area where a distance between the area and a closest lateral side of the bottom wall corresponds to no more than 25% of a length of a longitudinal sides of the bottom wall and a distance between the area and a closest longitudinal side corresponds to no more than 25% of a length of the lateral sides of the bottom wall. The embossing portions can be arranged within an area where a distance between the area and the closest lateral side of the bottom wall corresponds to no more than 10% of the length of the longitudinal sides of the bottom wall and a distance between the area and the closest longitudinal side corresponds to no more than 10% of the length of the lateral sides of the bottom wall. Each embossing portion can protrude by a height of between 0.1 to 0.5 mm. The height of each embossing portion can be larger than a thickness of the bottom wall.

According to still yet another aspect of the present invention, there is provided a lithium secondary battery that includes an electrode assembly including a positive electrode plate, a negative electrode plate and a separator arranged between the positive and negative electrode plates and a can comprising a bottom wall arranged opposite from an upper opening, wherein an embossing portion is arranged in the bottom wall at both sides of the a bottom wall of the can, the can being adapted to accommodate the electrode assembly, the can being further adapted to accommodate insertion of the electrode assembly into the can via the upper opening. The embossing portion can have a shape selected from the group consisting of a bar, conical and hemispherical.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings where like reference symbols indicate the same or similar components, wherein:

FIG. 2b is a front view of the can of FIG. 2a;

FIG. 5b is a sectional view of the can of FIG. 5a taken along A-A in FIG. 5a;

FIG. 8b is a sectional view of the can of FIG. 8a taken along B-B in FIG. 8a;

FIG. 9b is a sectional view of the can of FIG. 9a taken along C-C in FIG. 9a;

FIG. 10b is a sectional view the can of FIG. 10a taken along D-D in FIG. 10a;

DETAILED DESCRIPTION OF THE INVENTION

Figure 1:
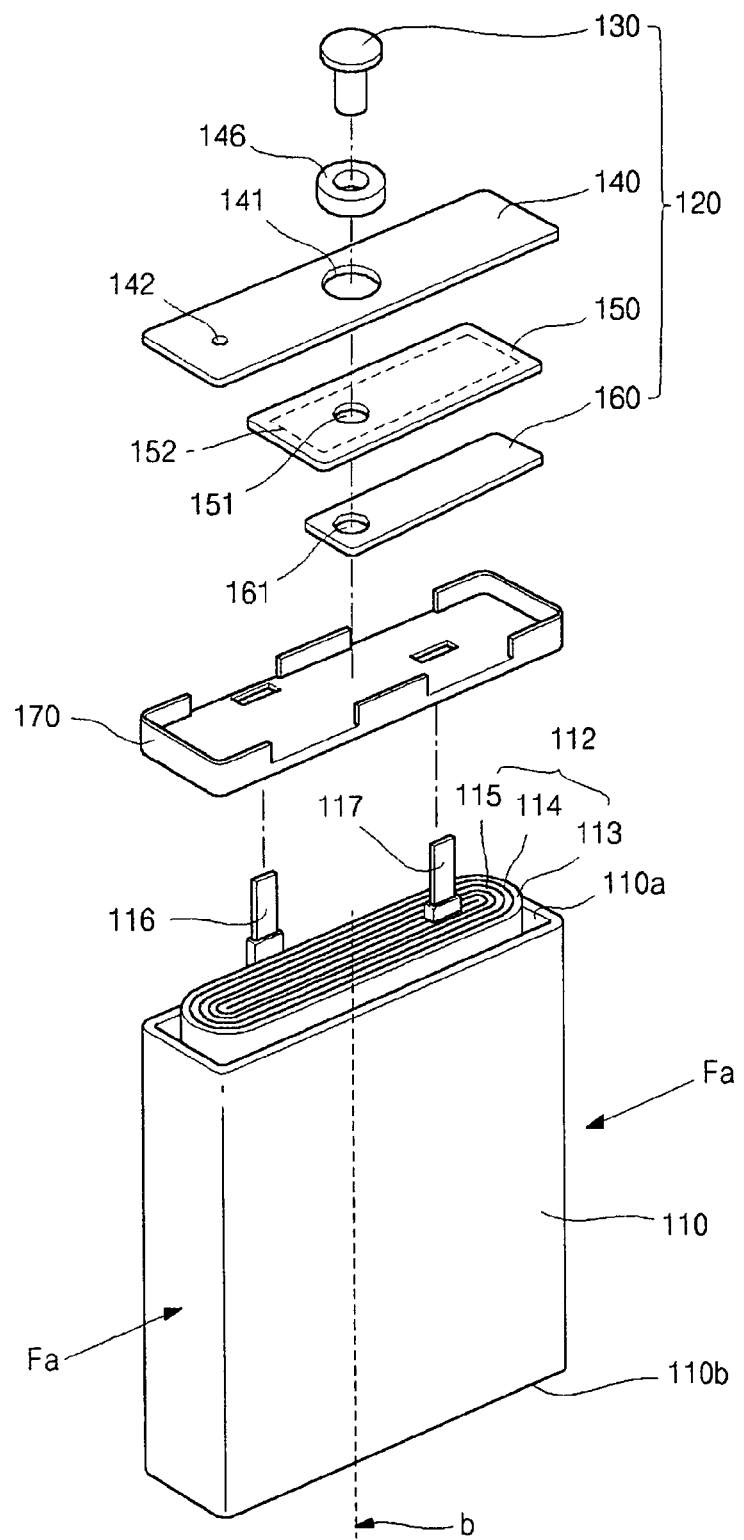
FIG. 1 is an exploded perspective view of a lithium secondary battery.

Turning now to the figures, FIG. 1 is an exploded perspective view of a lithium secondary battery. The lithium secondary battery of FIG. 1 can be obtained by accommodating an electrode assembly 112, that includes a positive electrode plate 113, a negative electrode plate 115 and a separator 114, into a can 110 together with an electrolyte, and then sealing an upper opening 110a of the can 110 using a cap assembly 120. In general, the can 110 is made of aluminum or an aluminum alloy and produced via a deep drawing process. In addition, a lower surface 110b of the can 110 is substantially planarized.

The electrode assembly 112 is formed by winding the positive electrode plate 113 together with the negative electrode plate 115 while interposing the separator 114 therebetween. A positive electrode tap 116 is coupled to the positive electrode plate 113 and an end portion of the positive electrode tap 116 protrudes upward from the electrode assembly 112. A negative electrode tap 117 is coupled to the negative electrode plate 115 and an end portion of the negative electrode tap 117 also protrudes upward from the electrode assembly 112. The positive electrode tap 116 is spaced apart from the negative electrode tap 117 by a predetermined distance so that the positive electrode tap 116 can be electrically insulated from the negative electrode tap 117. In general, the positive and negative electrode taps 116 and 117 are made out of nickel.

The cap assembly 120 includes a cap plate 140, an insulating plate 150, a terminal plate 160 and an electrode terminal 130. The cap assembly 120 is fits within an insulating case 170 and is assembled to the upper opening 110a of the can 110, thus sealing the can 110.

The cap plate 140 is made out of a metal plate having a size and a shape corresponding to that of the upper opening 110a of the can 110. The cap plate 140 is located at the center of upper opening 110a and is perforated by a first terminal hole 141 which accommodates the electrode terminal 130. When the electrode terminal 130 is inserted into the first terminal hole 141, a gasket tube 146 is fitted around the electrode terminal 130 in order to insulate the electrode terminal 130 from the cap plate 140. An electrolyte injection hole 142 having a predetermined size is located at one side of the cap plate 140. After the cap assembly 120 has been assembled to the upper opening 110a of the can 110, the electrolyte is injected into the can 110 through the electrolyte injection hole 142. Then, the electrolyte injection hole 142 is sealed by means of a plug 143.

The electrode terminal 130 is connected to the negative electrode tap 117 of the negative electrode plate 115 or the positive electrode tap 116 of the positive electrode plate 113 so that the electrode terminal 130 can serve as a negative electrode terminal or a positive electrode terminal.

The insulating plate 150 is made out of an insulating material identical to the material used for the gasket, and is coupled with the lower surface of the cap plate 140. The insulating plate 150 is perforated by a second terminal hole 151 that is aligned to the first terminal hole 141 of the cap plate 140 and into which the electrode terminal 130 is inserted. The insulating plate 150 is formed on the lower surface of the cap plate 140 and has a resting recess 152 having a size and a shape corresponding to that of the terminal plate 160 so that the terminal plate 160 can be rested in the resting recess 152.

The terminal plate 160 is made out of a Ni alloy and is coupled with the lower surface of the insulating plate 150. The terminal plate 160 is perforated by a third terminal hole 161 that is aligned to the first terminal hole 141 of the cap plate 140 and into which the electrode terminal 130 is inserted. Since the electrode terminal 130 inserted into the first terminal hole 141 of the cap plate 140 is insulated from the terminal plate 140 by means of the gasket tube 146, the terminal plate 160 can be electrically connected to the electrode terminal 130 while being electrically insulated from the cap plate 140.

Meanwhile, the negative electrode tap 117 coupled to the negative electrode plate 115 is welded to one side of the terminal plate 160 and the positive electrode tap 116 coupled to the positive electrode plate 113 is welded to other side of the cap plate 140. The negative and positive electrode taps 117 and 116 are welded to the terminal plate 160 and the cap plate 140 through resistance welding or laser welding. Of these, the resistance welding is preferred.

Recently, as energy density of the lithium secondary battery has increased, the lithium secondary battery has become smaller in size, causing the lithium secondary battery to becomes more vulnerable to damage upon impact and compression. Accordingly, when the lithium secondary battery is subject to such impact and compression, the electrode assembly within the can becomes deformed, causing a short circuit to be generated between electrode terminals, leading to accidental ignition or explosion of the lithium secondary battery.

In particular, as shown in FIG. 1, when the lithium secondary battery is deformed about a longitudinal axis b by longitudinal compression force Fa applied thereto during the longitudinal compression test, which is one of safety tests for the lithium secondary battery, the can is completely compressed without forming a predetermined regular shape. Thus, irregular pressure is locally applied to the electrode assembly within the can, so that short circuiting can occur between electrode plates of the electrode assembly, causing accidental ignition or explosion of the lithium secondary battery. Therefore, what is needed is an improved design for the can and for the lithium battery where the electrode assembly is less apt to be damaged by impact and compressive forces.

Figure 2A:
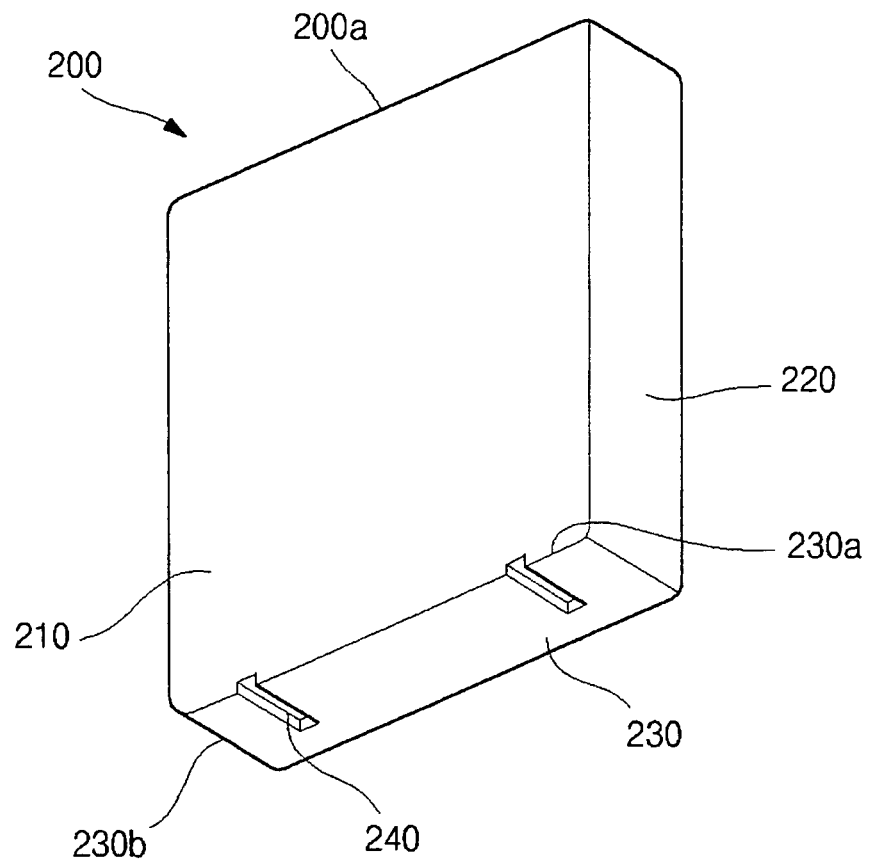
FIG. 2a is a perspective view of a can for a lithium secondary battery according to a first embodiment of the present invention.
Figure 2B:
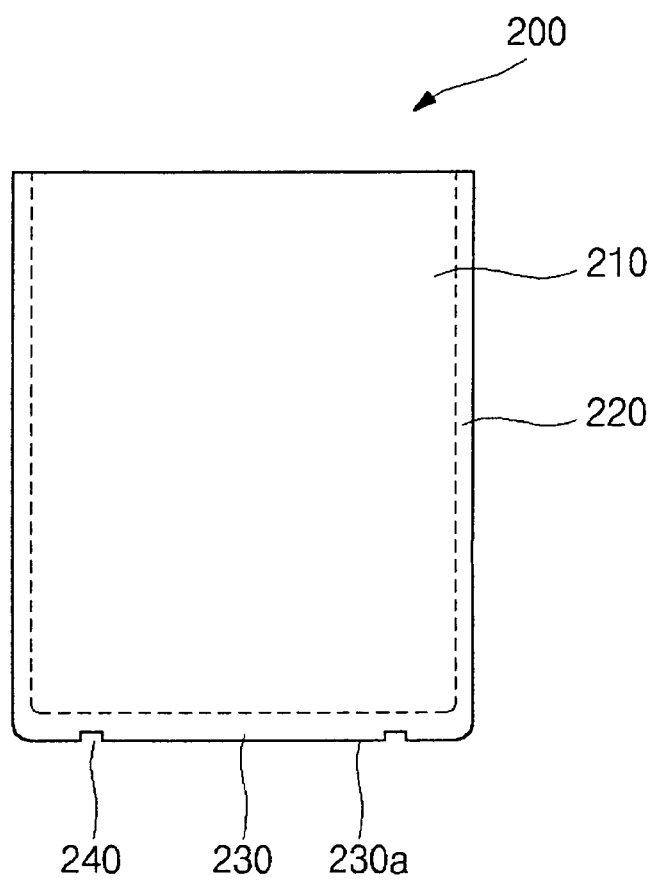

Turning now to FIGS. 2a and 2b, FIG. 2a is a perspective view of a can 200 for a lithium secondary battery according to a first embodiment of the present invention, and FIG. 2b is a front view of the can 200 of FIG. 2a. As shown in FIGS. 2a and 2b, the can 200 of the lithium secondary battery according to the first embodiment is fabricated in the form of a box and includes long-sidewalls 210, short-sidewalls 220 and a bottom wall 230. The can 200 having the box shape can have various cross sectional shapes, such as a rectangular shape or an oval shape. In addition, the can 200 is made out of metallic materials. Preferably, the can 200 is made out of aluminum or an aluminum alloy that is light-weight and flexible, but the present invention is in no way so limited. In general, the thickness of the long-sidewalls 210 and short-sidewalls 220 is within the range of about 0.2 to 0.4 mm. In addition, the thickness of the bottom wall 230 is within the range of about 0.2 to 0.7 mm. Preferably, the can 200 is fabricated via a deep drawing process and the long-sidewalls 210 are integrally formed with the short-sidewalls 220 and the bottom wall 230.

In detail, the can 200 includes an upper opening 200a formed at an upper portion of the can allowing for ingress and egress of an electrode assembly. Opposite upper opening 200a is bottom wall 230. The can 200 further includes sidewalls consisting of the long-sidewalls 210 having relatively larger widths and short-sidewalls 220 having relatively smaller widths. The long-sidewalls 210 are spaced apart from each other by a predetermined distance while facing each other, thus forming front and rear surfaces of the can 200. In addition, the short-sidewalls 220 are spaced apart from each other by a predetermined distance while facing each other, thus forming both lateral surfaces of the can 200. If the can 200 has a substantially rectangular box shape (rectangular cross section), the long-sidewalls 210 and short-sidewalls 220 have planar shapes. However, if the can 200 has an oval-cylindrical shape (oval cross section) rather than the rectangular box shape, the short-sidewalls 220 are smoothly curved, so that there is no boundary line between the long-sidewalls 210 and short-sidewalls 220.

The bottom wall 230 forms the bottom of the can 200 and is provided at an outer surface thereof and includes bar-shaped guide slots 240 having predetermined lengths. In detail, each guide slot 240 has a bar shape having a predetermined length and a orthogonal section thereof has an arcuate shape or a rectangular shape. However, the present invention does not specifically limit the shape of the orthogonal section of each guide slot 240. Preferably, an edge portion of each guide slot 240 is curved so as to improve the strength of the can 200. Each guide slot 240 extends from a lower end portion of one long-sidewall 230a (that is, a front end or a rear end of the bottom wall 230) toward the other long-sidewall. Further, each guide slot 240 is recessed in the bottom wall 230. Preferably, each guide slot 240 has a length corresponding to at least 25% of a length of a lateral side 230b of the bottom wall 230, that is, corresponding to at least 25% of the width of the bottom wall 230. If the length of each guide slot 240 is less than 25% of the width of the bottom wall 230, it is difficult to effectively guide the deformation direction of the can 200 when the lithium secondary battery is compressed in the direction orthogonal to the longitudinal axis thereof, so that the can 200 can not be symmetrically bent about the longitudinal axis. Preferably, a width of an upper portion of each guide slot 240 is less than 3 mm. Since each guide slot 240 has a rectangular cross section, a width of a bottom portion of each guide slot 240 is also less than 3 mm. Each guide slot 240 acts as a weak point at the lower portion of the can 200, so each guide slot 240 can weaken the strength of the can 200 when the width of each guide slot 240 is too large. For this reason, the width of each guide slot 240 is preferably less than 3 mm, and more preferably less than 1 mm. In addition, a depth of each guide slot 240 is less than 25% of the thickness of the bottom wall 230. As described above, since each guide slot 240 acts as a weak point at the lower portion of the can 200, each guide slot 240 can weaken the strength of the can 200 if each guide slot 240 is too deep. For this reason, the depth of each guide slot 240 is preferably less than 25% of the thickness of the bottom wall 230, and more preferably less than 10% of the thickness of the bottom wall 230.

Each guide slot 240 is spaced apart from a corresponding lateral side 230b of the bottom wall 230 by a predetermined distance and is aligned parallel to the corresponding lateral side 230b of the bottom wall 230. Preferably, the distance between a lateral side 230b of the bottom wall 230 and a corresponding guide slot 240 is within 25% of the length of the bottom wall 230. More preferably, the distance between a lateral side 230b of the bottom wall 230 and a corresponding guide slot 240 is within 10% of the length of the bottom wall 230. If the distance between a lateral side 230b of the bottom wall 230 and a corresponding guide slot 240 exceeds 25% of the length of the bottom wall 230, the can 200 can not deform symmetrically about the longitudinal axis of the can 200 when longitudinal compression is applied to the lithium secondary battery.

Figure 3:
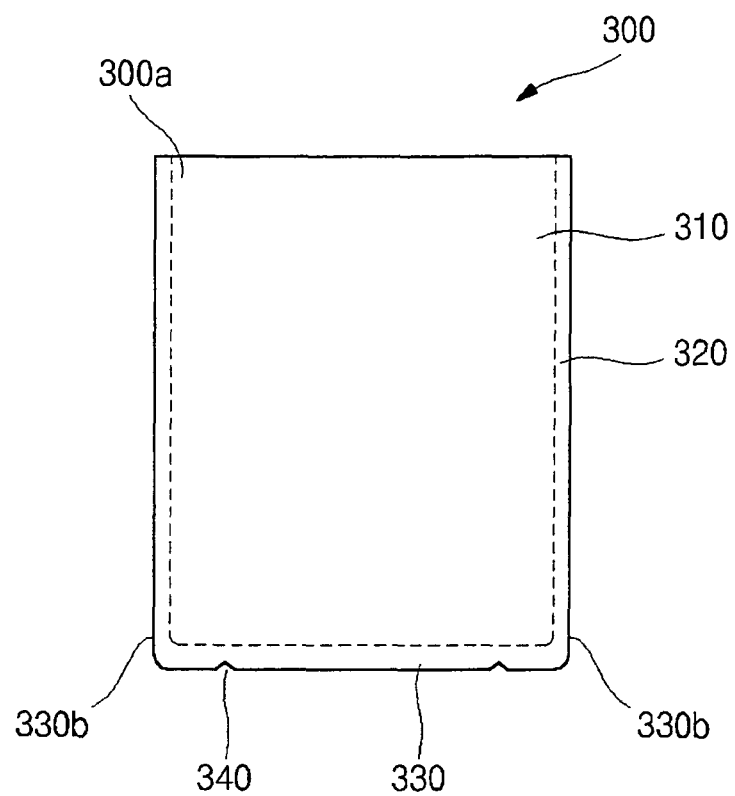
FIG. 3 is a front view of a can for a lithium secondary battery according to a second embodiment of the present invention.

Turning now to FIG. 3, FIG. 3 is a front view of a can 300 for a lithium secondary battery according to a second embodiment of the present invention. Referring to FIG. 3, the can 300 according to the third embodiment of the present invention includes notch-type guide slots 340 formed in an outer surface of a bottom wall 330 to a predetermined length. In detail, each guide slot 340 has a bar shape having a triangular cross-section. Each guide slot 340 according to this second embodiment is substantially identical to each guide slot 240 shown in FIG. 2a, except that each guide slot 340 has the triangular cross section, rather than the rectangular cross section. If each guide slot 340 has the triangular cross section, each guide slot 340 can be easily deformed when the can 300 is subject to longitudinal compression, so each guide slot 340 can effectively guide the deformation of the can 300. In addition, an edge portion of each notch-type guide slot 340 is curved so as to improve the strength of the can 300. Accordingly, in the same manner as the first embodiment shown in FIG. 2a, each guide slot 340 extends from a front end or a rear end of the bottom wall 330 while being recessed in the bottom wall 330. In addition, preferably, each guide slot 340 has a length corresponding to at least 25% of the width of the bottom wall 330. Preferably, a width of an upper portion of each guide slot 340 is less than 3 mm. More preferably, the width of the upper portion of each guide slot 340 is less than 1 mm. Since each guide slot 340 acts as a weak point at the lower portion of the can 300, each guide slot 340 can weaken the strength of the can 300 if the width of each guide slot 340 is too large. In addition, a depth of each guide slot 340 is preferably less than 25% of the thickness of the bottom wall 330, and more preferably less than 10% of the thickness of the bottom wall 330.

Each guide slot 340 is aligned to be parallel to a corresponding (i.e., the nearest) lateral side 330b of the bottom wall 330. Preferably, the distance between a lateral side 330b of the bottom wall 330 and a corresponding guide slot 340 is within 25% of the length of the bottom wall 330. More preferably, the distance between a lateral side 330b of the bottom wall 330 and a corresponding guide slot 340 is within 10% of the length of the bottom wall 330.

Figure 4:
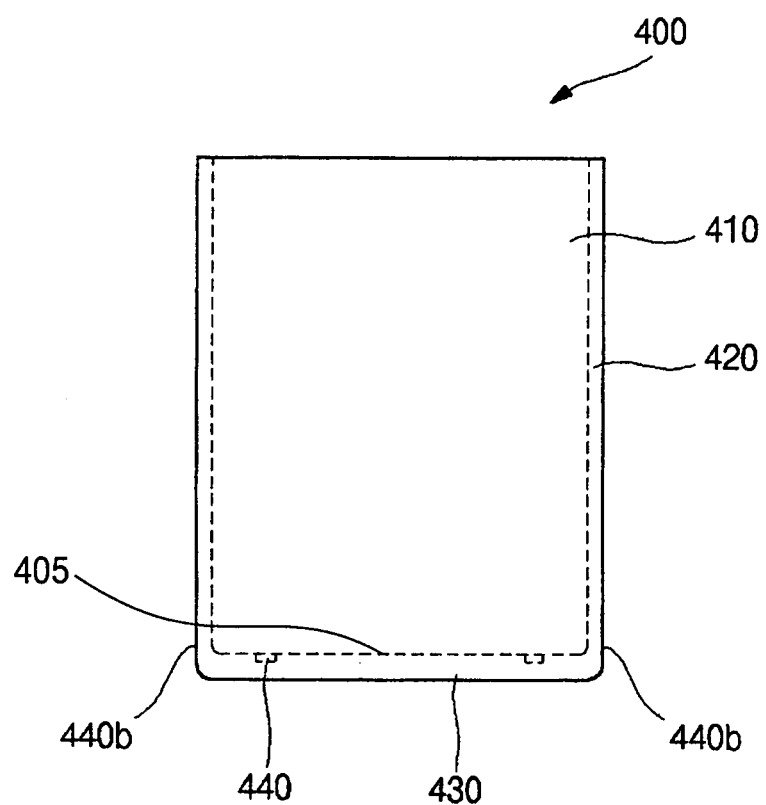
FIG. 4 is a front view of a can for a lithium secondary battery according to a third embodiment of the present invention.

Turning now to FIG. 4, FIG. 4 is a front view of a can 400 for a lithium secondary battery according to a third embodiment of the present invention. Referring to FIG. 4, the can 400 according to the third embodiment includes bar-shaped guide slots 440 formed at a predetermined inner portion of a bottom wall 430 to a predetermined length. In detail, each guide slot 440 according to this third embodiment is substantially identical to each guide slot 240 shown in FIG. 2a, except that each guide slot 440 is formed in an inner surface 405 of the can 400 instead of in the outer surface of the can 400. Each guide slot 440 extends from a lower inner portion of one long-sidewall 410 toward the other long-side wall 410 and is recessed in an upper surface of the bottom wall 430. In addition, preferably, each guide slot 440 has a length corresponding to at least 25% of the width of the bottom wall 430. Preferably, a width of an upper portion of each guide slot 440 is less than 3 mm. More preferably, the width of the upper portion of each guide slot 440 is less than 1 mm. In addition, a depth of each guide slot 440 is preferably less than 25% of the thickness of the bottom wall 430, more preferably, less than 10% of the thickness of the bottom wall 430. Each guide slot 440 is aligned to be parallel to a corresponding lateral side 430b of the bottom wall 430. Preferably, the distance between a lateral side 430b of the bottom wall 430 and a corresponding guide slot 440 is within 25% of the length of the bottom wall 430. More preferably, the distance between a lateral side 430b of the bottom wall 430 and a corresponding guide slot 440 is within 10% of the length of the bottom wall 430.

Figure 5A:
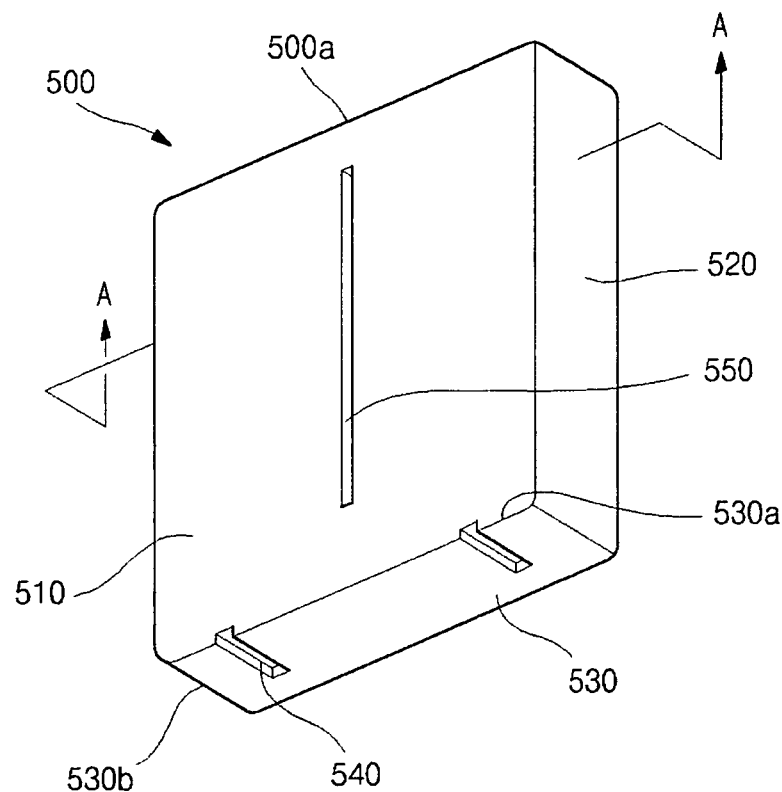
FIG. 5a is a perspective view of a can for a lithium secondary battery according to a fourth embodiment of the present invention.
Figure 5B:
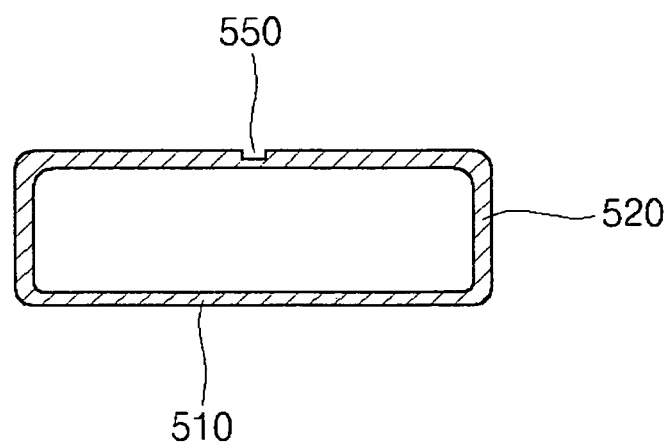

Turning now to FIGS. 5a and 5b, FIG. 5a is a perspective view of a can 500 for a lithium secondary battery according to a fourth embodiment of the present invention, and FIG. 5b is a cross sectional view of the can 500 of FIG. 5a taken along A-A of FIG. 5a. Referring to FIGS. 5a and 5b, the can 500 of the lithium secondary battery according to the fourth embodiment includes first guide slots 540 formed in an outer surface of a bottom wall 530 and a second guide slot 550 formed at a predetermined portion in the long-sidewall 510 and extending parallel to a longitudinal axis of the can 500. The first guide slots 540 have a shape identical to that of each guide slots 240, 340 or 440 of FIGS. 2a, 3 and 4, respectively. The second guide slot 550 is formed at the center portion of the long-sidewall 510 and is parallel to the longitudinal axis of the can 500. The second guide slot 550 can have either an arcuate, a rectangular or a triangular cross sectional shape and is fabricated in the form of a bar having a predetermined length. The shape of the second guide slot 550 is similar to the shape of each of guide slots 240, 340 and 440. In addition, the second guide slot 550 has a length corresponding to at least 50% of a height of the long-sidewall 510. If the length of each guide slot 550 is less than 50% of the height of the long-sidewall 510, it is difficult to effectively guide the deformation direction of the can 500 when the lithium secondary battery is compressed in the direction orthogonal to the longitudinal axis thereof. Preferably, a width of an upper portion of the second guide slot 550 is less than 3 mm, and more preferably less than 1 mm. Since the second guide slot 550 acts as a weak point in the long-sidewall 510 of the can 500, the second guide slot 550 can weaken the strength of the can 500 if the width of the second guide slot 550 is too large. In addition, when the second guide slot 550 has the rectangular or the triangular cross section, an edge portion thereof is curved so as to improve the strength of the can. A depth of the second guide slot 550 is less than 25% of the thickness of the long-sidewall 510. More preferably, the depth of the second guide slot 550 is less than 10% of the thickness of the long-sidewall 510. As mentioned above, the second guide slot 550 acts as a weak point in the long-sidewall 510 of the can 500, so the second guide slot 550 can weaken the strength of the can 500 if the second guide slot 550 is too deep.

Figure 6:
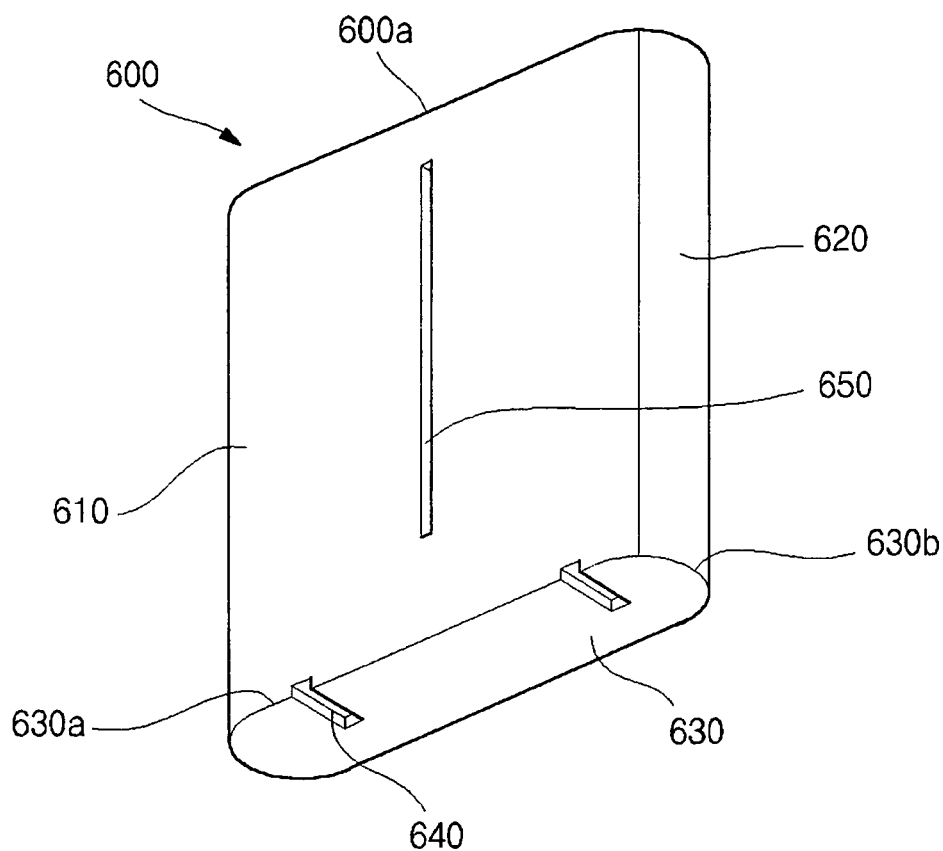
FIG. 6 is a perspective view of a can for a lithium secondary battery according to a fifth embodiment of the present invention.

Turning now to FIG. 6, FIG. 6 is a perspective view of a can 600 for a lithium secondary battery according to a fifth embodiment of the present invention. Referring to FIG. 6, the can 600 according to the fifth embodiment includes long-sidewalls 610, short-sidewalls 620 and a bottom wall 630. The short-sidewalls 620 are smoothly curved, so that the can 600 is an oval-cylindrical structure with an oval horizontal cross section. The can 600 of this fifth embodiment is substantially identical to the can shown in FIGS. 2a through 5 except that the short-sidewalls 620 of the can 600 are smoothly curved. That is, the can 600 is formed with first guide slots 640 and a second guide slot 650 substantially identical to those of the can shown in FIGS. 2a to 5. Thus, the shape and the position of the first and second guide slots 640 and 650 will not be further described below.

The cans according to the present invention are suitable for the lithium secondary battery shown in FIG. 1. However, the present invention does not specifically limit the structure of the lithium secondary battery for which the cans according to the present invention apply. That is, the cans of the present invention can be applicable to lithium secondary batteries having other various structures besides that of FIG. 1.

Figure 7:
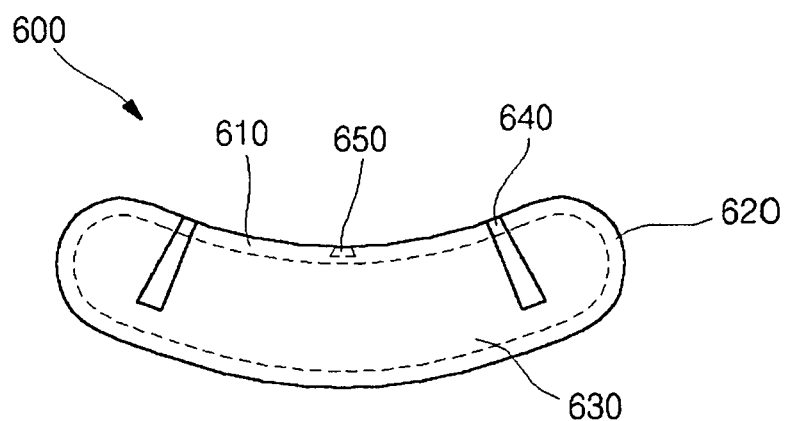
FIG. 7 is a bottom view of the can of FIG. 6 illustrating an operational state of the can of FIG. 6 when under compression.

Hereinafter, the operation of the can 600 according to the fifth embodiment upon application of a compressive force when used in a lithium secondary battery will now be described with reference to FIG. 7. FIG. 7 is a bottom view of an operational state of the can 600 of FIG. 6 when under compressive force. FIG. 7 shows the deformation direction of the can when the longitudinal compression test is performed with respect to can 600.

Referring to FIGS. 6 and 7, the can 600 for the lithium secondary battery according to the fifth embodiment includes the first guide slots 640 formed at the outer surface of the bottom wall 630 and the second guide slot 650 formed in one long-sidewall 610, the lower end portion of which is connected to the first guide slots 640. Therefore, if the short-sidewalls 620 of the can 600 are compressed in the direction orthogonal to the longitudinal axis of the can 600, the shape of the first guide slots 640 are deformed while guiding the deformation direction of the can 600 toward the long-sidewall 610 connected to the first guide slots 640. Since the first guide slots 640 act as the weak point for the bottom wall 630 of the can 600, the first guide slots 640 are primarily deformed. In addition, since the can 600 is formed with the second guide slot 650, the can 600 can be effectively deformed in the direction of the longitudinal axis due to deformation of the second guide slot 650. Accordingly, when the can 600 or the lithium secondary battery having the can 600 as shown in FIG. 1 is subject to longitudinal compression, the can 600 or the lithium secondary battery is symmetrically bent about the longitudinal axis of the can 600. Therefore, the electrode assembly accommodated within the can 600 is also symmetrically bent about the longitudinal axis of the can 600, so that short circuiting is prevented from occurring between the electrode plates of the electrode assembly.

Figure 8A:
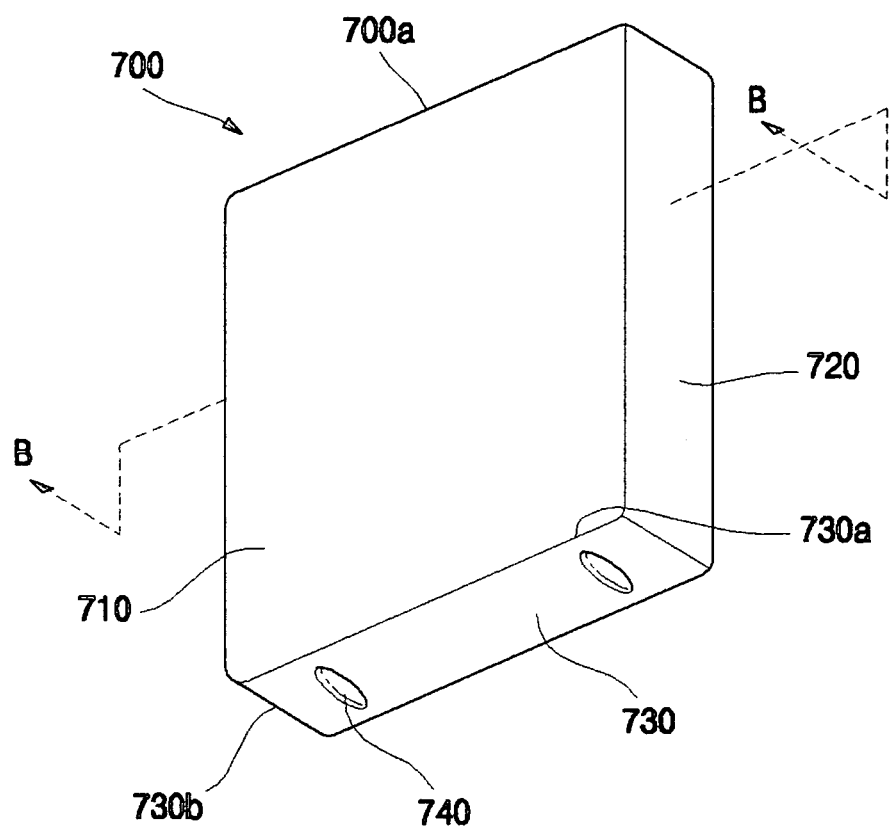
FIG. 8a is a perspective view of a can for a lithium secondary battery according to a sixth embodiment of the present invention.
Figure 8B:
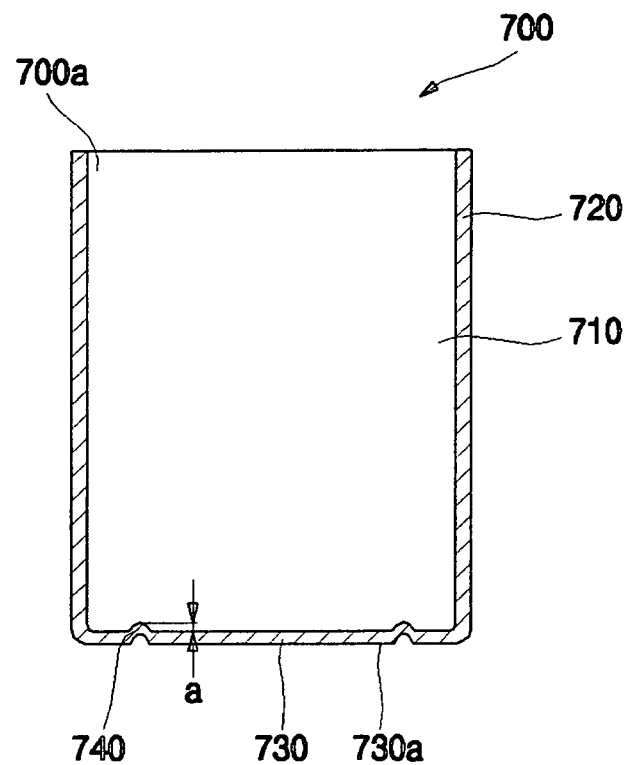

Turning now to FIGS. 8a and 8b, FIG. 8a is a perspective view of can 700 for a lithium secondary battery according to a sixth embodiment of the present invention, and FIG. 8b is a cross sectional view of can 700 taken along B-B shown in FIG. 8a. Referring to FIGS. 8a and 8b, the can 700 according to the sixth embodiment is fabricated in the form of a box and includes long-sidewalls 710, short-sidewalls 720 and a bottom wall 730. The can 700 having the box shape can have various cross sectional shapes, such as a rectangular shape or an oval shape. In addition, the can 700 is made out of metallic materials. Preferably, the can 700 is made out of aluminum or an aluminum alloy having light-weight and flexibility. However, the present invention does not specifically limit the materials for the can 700.

Preferably, the can 700 is fabricated through a deep drawing process and the long-sidewalls 710 are integrally formed with the short-sidewalls 720 and the bottom wall 730. In detail, the can 700 is provided with sidewalls consisting of the long-sidewalls 710 having relatively larger widths and short-sidewalls 720 having relatively smaller widths. The long-sidewalls 710 are spaced apart from each other by a predetermined distance while facing each other, thus forming front and rear surfaces of the can 700. In addition, the short-sidewalls 720 are spaced apart from each other by a predetermined distance while facing each other, thus forming both lateral surfaces of the can 700. If the can 700 has a substantially rectangular box shape, the long-sidewalls 710 and short-sidewalls 720 have planar shapes. However, if the can 700 has an oval-cylindrical shape instead of the rectangular box shape, the short-sidewalls 720 are smoothly curved, so that there is no boundary line between the long-sidewalls 710 and short-sidewalls 720. In addition, an upper opening 700a is formed at an upper portion of the can 700 opposite bottom wall 730.

The bottom wall 730 forms the bottom of the can 700 and is preferably provided, at an upper surface thereof, with embossing portions 740 protruding toward an inner portion of the can 700. In detail, each embossing portion 740 has a bar shape or a rectangular column shape having a predetermined length and a orthogonal cross section of each embossing portion 740 has a substantially circular, a triangular or a rectangular shape. However, the present invention does not specifically limit the shape of each embossing portion 740 provided each embossing portion 740 protrudes from a predetermined portion of the bottom wall 730 toward the inner portion of the can 700. In addition, preferably, each embossing portion 740 has a length corresponding to at least 50% of a length of each lateral side 730b. If the length of each embossing portion 740 is less than 50% of the length of each lateral side 730b, the bottom wall 730 of the can 700 can not be bent outward when the lithium secondary battery is subject to longitudinal compression. Each embossing portion 740 is spaced apart from the lateral side 730b of the bottom wall 730 by a predetermined distance and is aligned parallel to the lateral side 730b of the bottom wall 730. Preferably, the distance between a lateral side 730b of the bottom wall 730 and a corresponding embossing portion 740 is within 25% of the length of a longitudinal side 730a of the bottom wall 730. More preferably, the distance between a lateral side 730b of the bottom wall 730 and a corresponding embossing portion 740 is within 10% of the length of the longitudinal side 730a of the bottom wall 730. If the distance between the lateral side 730b of the bottom wall 730 and the embossing portion 740 exceeds 25% of the length of the longitudinal side 730a of the bottom wall 730, the bottom wall 730 of the can 700 can be partially or fully bent toward the inner portion of the can 700 when longitudinal compression is applied to the lithium secondary battery.

Each embossing portion 740 protrudes towards the inner portion of the can 700 by a height of 0.1 to 0.5 mm. Preferably, each embossing portion 740 has a height larger than 50% of a thickness of the bottom wall 730. That is, a distance (a) between an upper surface of the bottom wall 730 and an upper end of an embossing portion 740 is identical to or larger than 50% of the thickness of the bottom wall 730. In general, the thickness of the long-sidewall 710 and the short-sidewall 720 of the can 700 is in the range of 0.2 to 0.4 mm and the thickness of the bottom wall 730 of the can 700 is in the range of 0.2 to 0.7 mm. Accordingly, when the bottom wall 730 of the can 700 has a thickness of about 0.5 mm, each embossing portion 740 has the height of about 0.25 to 0.5 mm. If the height of each embossing portion 740 is less than 0.1 mm, the effect of each embossing portion 740 is significantly reduced, resulting in the bottom wall 730 of the can 700 bending only slightly outward when the lithium secondary battery is subject to longitudinal compression. In contrast, if the height of each embossing portion 740 is too large, each embossing portion 740 can cause damage to the electrode assembly (not shown) accommodated within the can 700. For these reason, the height of each embossing portion 740 is preferably less than 0.5 mm.

Figure 9A:
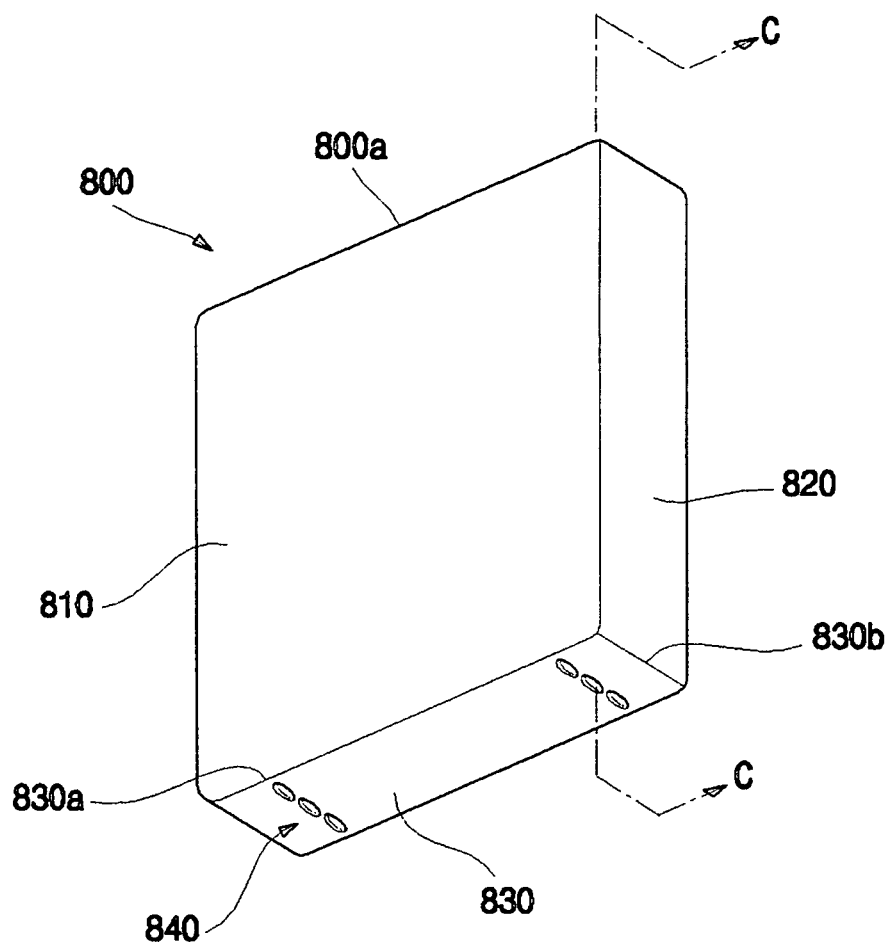
FIG. 9a is a perspective view of a can for a lithium secondary battery according to a seventh embodiment of the present invention.
Figure 9B:
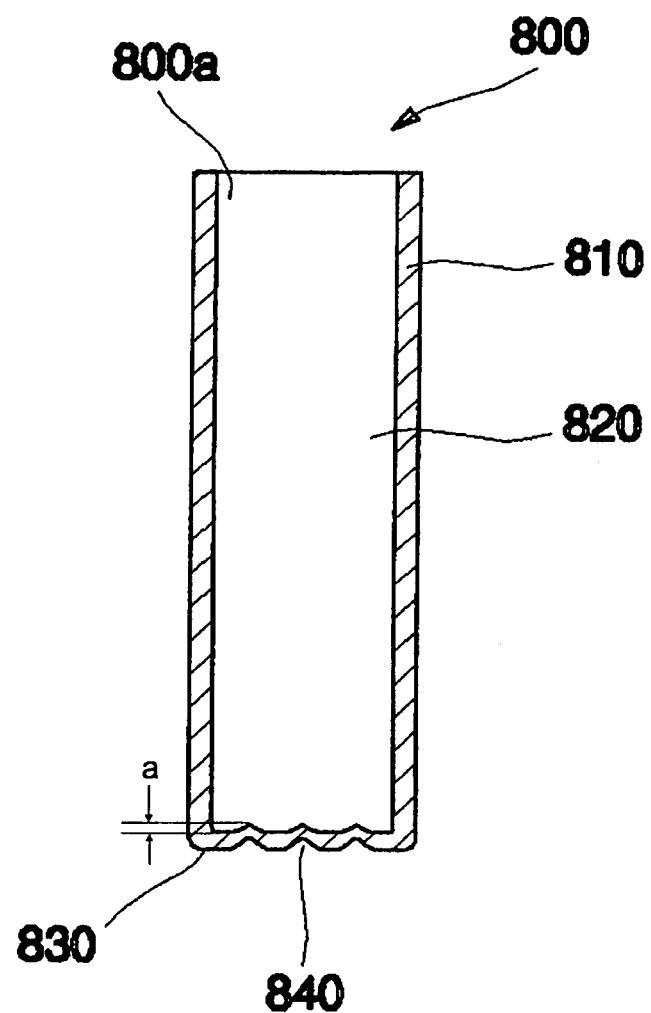

Turning now to FIGS. 9a and 9b, FIG. 9a is a perspective view of can 800 for a lithium secondary battery according to a seventh embodiment of the present invention, and FIG. 9b is a cross sectional view of can 800 taken along C-C of FIG. 9a. Referring to FIGS. 9a and 9b, the can 800 according to the seventh embodiment includes sidewalls consisting of the long-sidewalls 810 having relatively larger widths and short-sidewalls 820 having relatively smaller widths and an opening 800a at a top of the can opposite from the bottom wall 830. Embossing portions 840 are formed in a bottom wall 830 of the can while protruding toward an inner portion of the can 800. The embossing portions 840 have a circular, a polygonal conical, or a hemispherical shape. In addition, a plurality of embossing portions 840 are aligned in line with each other and parallel to a lateral side 830b of the bottom wall 830. However, the present invention does not specifically limit the shape of the embossing portions 840 provided the embossing portions 840 protrude from a predetermined portion of the bottom wall 830 toward the inner portion of the can 800.

Preferably, the embossing portions 840 are located within an area corresponding to at least 50% of a length of a lateral side 830b. Accordingly, the number of embossing portions 840 can be varied according to the size of each embossing portion 840, the size of the area where the embossing portions 840 are located, and the length of the lateral side 830b. If the size of the area where the embossing portions 840 are located is less than 50% of the length of the lateral side 830b, the bottom wall 830 of the can 800 can not be bent outward when the lithium secondary battery is subject to longitudinal compression. The embossing portions 840 are spaced apart from corresponding the lateral sides 830b of the bottom wall 830 by a predetermined distance. Preferably, the distance between a lateral side 830b of the bottom wall 830 and the corresponding embossing portions 840 are within 25% of the length of a longitudinal side 830a of the bottom wall 830. More preferably, the distance between a lateral side 830b of the bottom wall 830 and the corresponding embossing portions 840 are within 10% of the length of the longitudinal side 830a of the bottom wall 830. If the distance between a lateral side 830b of the bottom wall 830 and the corresponding embossing portions 840 exceed 25% of the length of the longitudinal side 830a of the bottom wall 830, the bottom wall 830 of the can 800 can be bent toward the inner portion of the can 800 when longitudinal compression is applied to the lithium secondary battery.

Similar to the embossing portion 740 of can 700 of FIG. 8a, the embossing portions 840 of FIGS. 9a and 9b protrude towards the inner portion of the can 800 by a height of 0.1 to 0.5 mm. Preferably, the height (0.1 to 0.5 mm) of the embossing portions 840 is larger than 50% of a thickness of the bottom wall 830. That is, a distance (a) between an upper surface of the bottom wall 830 and an upper end of an embossing portion 840 is identical to or larger than 50% of the thickness of the bottom wall 830.

Figure 10A:
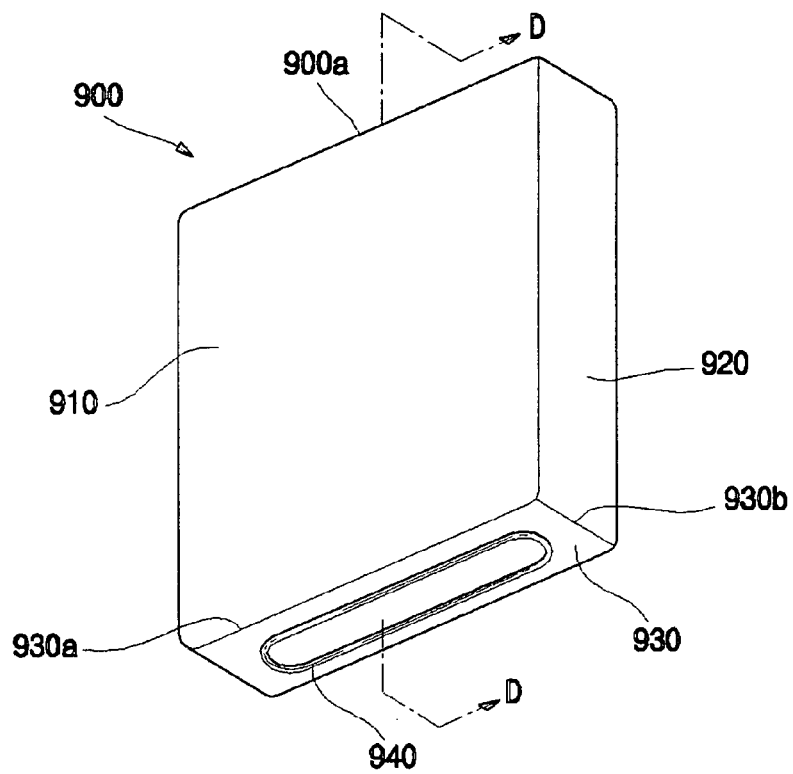
FIG. 10a is a perspective view of a can for a lithium secondary battery according to an eighth embodiment of the present invention.
Figure 10B:
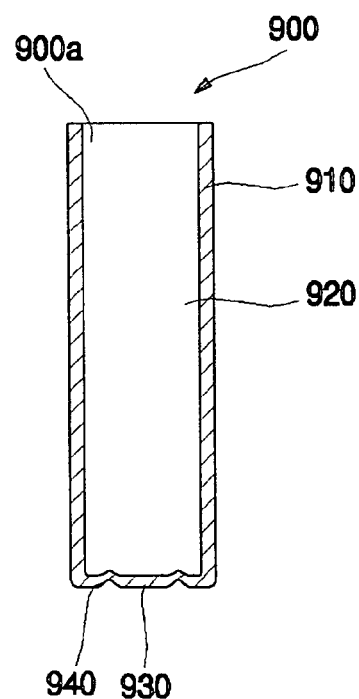

Referring now to FIGS. 10a and 10b, FIG. 10a is a perspective view of can 900 for a lithium secondary battery according to an eighth embodiment of the present invention, and FIG. 10b is a sectional view of can 900 taken along D-D in FIG. 10a. In FIGS. 10a and 10b, the can 900 according to the eighth embodiment includes long-sidewalls 910 having relatively larger widths and short-sidewalls 920 having relatively smaller widths and an opening 900a at a top of the can 900 opposite from bottom wall 930. An embossing portion 940 formed in a bottom wall 930 of the can 900 while protruding toward an inner portion of the can 900. In detail, the embossing portion 940 has a closed-loop shape having a predetermined width and is formed in the bottom wall 930 of the can 900 while being spaced from lateral sides 930b and longitudinal sides 930a of the bottom wall 930 by a predetermined distance. Therefore, when the bottom wall 930 has a rectangular shape or an oval shape, the embossing portion 930 having a predetermined width is formed in the bottom wall 930 to have a rectangular closed-loop shape or an oval closed-loop shape. Preferably, the embossing portion 940 is located within an area where a distance between the area and the nearest lateral side 930b corresponds to no more than 25% of a length of a longitudinal side 930a and a distance between the area and the nearest longitudinal side 930a corresponds to no more than 25% of a length of the lateral side 930b. More preferably, the embossing portion 940 is located within an area where a distance between the area and the nearest lateral side 930b corresponds to no more than 10% of the length of the longitudinal side 930a and a distance between the area and the nearest longitudinal side 930a corresponds to no more than 10% of the length of the lateral side 930b. If the distance between the embossing portion 940 and nearest lateral side 930b exceeds 25% of the length of the longitudinal side 930a, the embossing portion 940 is formed in the center region of the bottom wall 930, so that the bottom wall 930 can not be effectively bent outward when longitudinal compression is applied to the can 900.

As described above with reference to previous embodiments, the embossing portion 940 protrudes towards the inner portion of the can 900 to a height of 0.1 to 0.5 mm. Preferably, the height (0.1 to 0.5 mm) of the embossing portion 940 is larger than 50% of a thickness of the bottom wall 930. In addition, since the embossing portion 940 is aligned in the bottom wall 930 of the can 900 and is parallel to the longitudinal side 930a of the bottom wall 930, the embossing portion 940 can reinforce the strength of the bottom wall 930.

In addition, for the can 900 of FIGS. 10a and 10b, since the embossing portion 940 is aligned on the bottom wall 930 of the can 900 and parallel to the longitudinal sides 930a of the bottom wall 930, the embossing portion 940 can reinforce the strength of the bottom wall 930 in the direction of the long-sidewalls 910. Thus, when the longitudinal compression test is performed on the can 900 by applying standard longitudinal compression force to the can 900, deformation of the can 900 can be minimized, thus improving safety of the lithium secondary battery.

Figure 11:
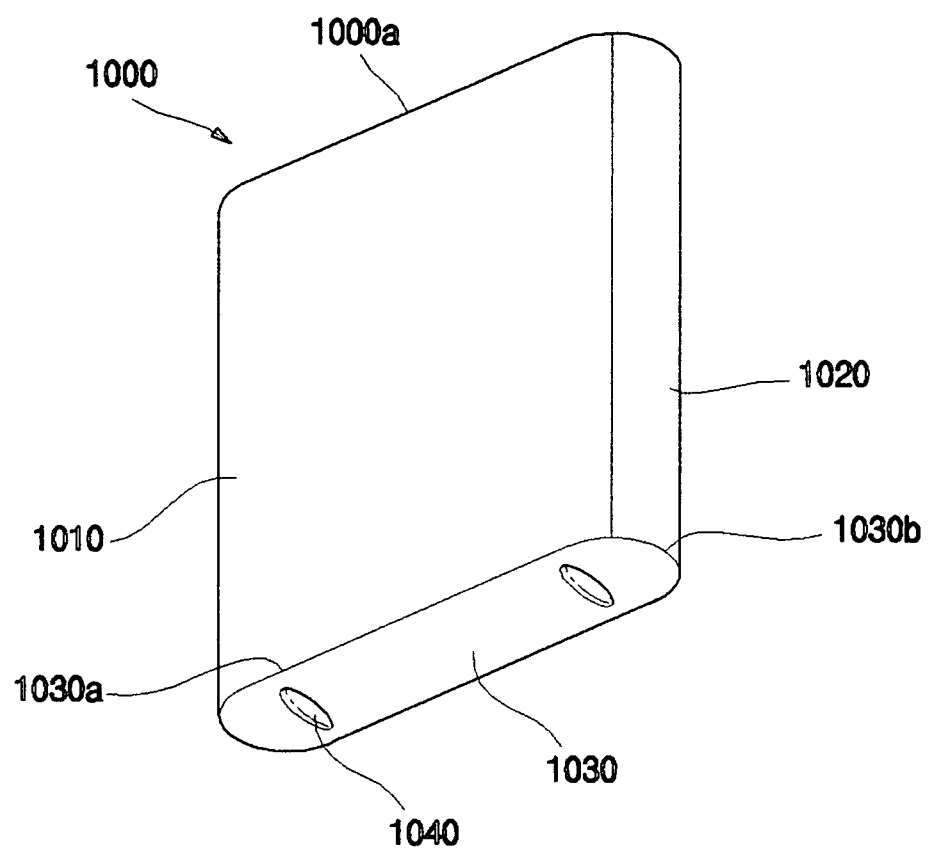
FIG. 11 is a perspective view of a can for a lithium secondary battery according to a ninth embodiment of the present invention.

Turning now to FIG. 11, FIG. 11 is a perspective view of can 1000 for a lithium secondary battery according to a ninth embodiment of the present invention. In FIG. 11, the can 1000 according to the ninth embodiment includes long-sidewalls 1010, short-sidewalls 1020 and a bottom wall 1030. The short-sidewalls 1020 are curved so that the can 1000 has an oval-cylindrical structure having an oval-shaped horizontal cross section. Accordingly, different from the cans shown in FIG. 8a or 9a, a boundary line can not be formed between the long-sidewalls 1010 and short-sidewalls 1020 in the can 1000 because of the curvature of the short-sidewalls 1020. An upper opening 1000a is formed at an upper end portion of the can 1000. In addition, embossing portions 1040 are formed in the bottom wall 1030 of the can 1000 while protruding toward the inner portion of the can 1000. Similar to the embossing portion shown in FIG. 8a, each embossing portion 1040 has a conical structure having a predetermined length. In addition, each embossing portion 1040 has a substantially triangular cross section. In addition, each embossing portion 1040 is spaced apart from a corresponding lateral side 1030b of the bottom wall 1030 by a predetermined distance. Each embossing portion 1040 according to the present embodiment has the shape identical to that of the embossing portions shown in FIG. 8*a* or 9*a*, so it will not be further described below.

The cans according to the present invention are suitable for the lithium secondary battery shown in FIG. 1. However, the present invention does not specifically limit the structure of the lithium secondary battery to that of FIG. 1 for the cans of the present invention. That is, the cans of the present invention are also applicable to other lithium secondary batteries having other structures.

Figure 12:
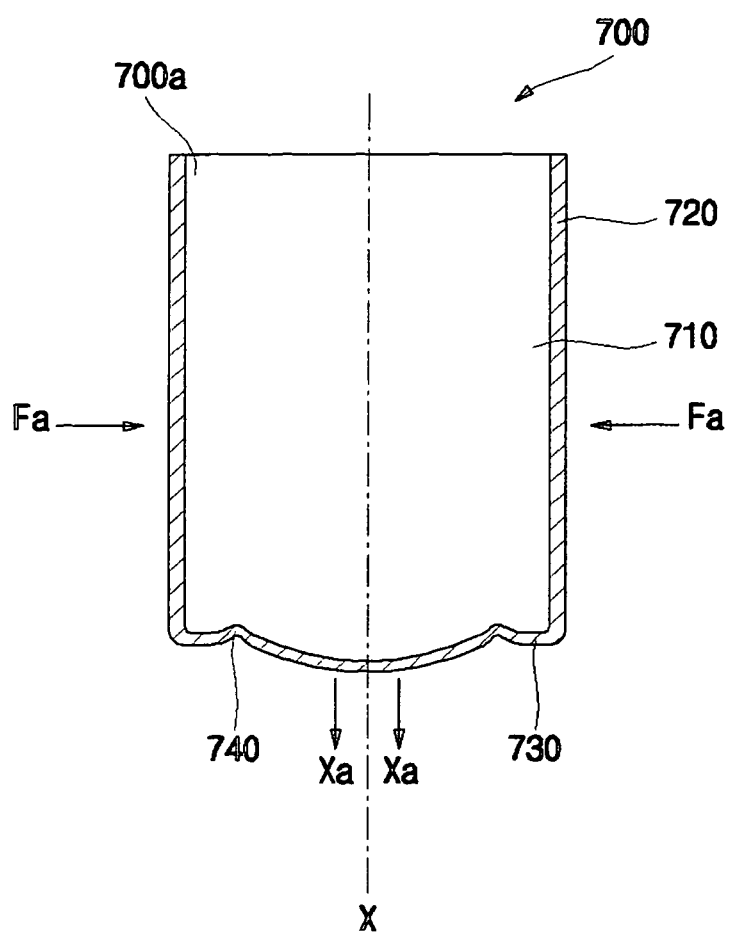
FIG. 12 is a sectional view of the can of FIGS. 8a and 8b when under compression.

Hereinafter, the operation of can 700 of FIGS. 8*a* and 8*b* in a lithium secondary battery will be described in conjunction with FIG. 12. Referring now to FIG. 12, FIG. 12 is a sectional view of the deformation direction of the can 700 of the sixth embodiment in a lithium secondary battery upon longitudinal compression. Referring to FIGS. 8*a* and 8*b*, the can 700 includes the embossing portions 740 formed in the bottom wall 730. Accordingly, when the can 700 or the lithium secondary battery of FIG. 1 having the can 700 of FIGS. 8*a* and 8*b* is bent about the longitudinal axis thereof or compressed in the direction orthogonal to the longitudinal axis due to longitudinal compression applied to the lithium secondary battery, the bottom wall 730 of the can 700 is bent outward rather than inward (see, arrows Xa in FIG. 12). Therefore, the bottom wall 730 of the can 700 does not apply force to the lower portion of the electrode assembly (not shown) accommodated within the can 700, thus preventing a short circuit from occurring between electrode plates of the electrode assembly, leading to improved safety of the lithium secondary battery.

Although the present invention has been described with reference to the lithium secondary battery, the can of the present invention is also applicable for other secondary batteries.

As described above, according to the present invention, guide slots are formed in the bottom wall and in the sidewall of the can of the lithium secondary battery so that the can is symmetrically bent about the longitudinal axis thereof when the lithium secondary battery is compressed in the direction orthogonal to the longitudinal axis, thus preventing a short circuit from occurring between electrode plates, leading to improved safety of the lithium secondary battery.

In addition, according to the present invention, embossing portions are formed in the bottom wall of the can of the lithium secondary battery while protruding toward the inner portion of the can, so that the bottom wall of the can is outwardly bent when the lithium secondary battery is compressed in the direction orthogonal to the longitudinal axis. Accordingly, the bottom wall will not apply a force to the lower portion of the electrode assembly accommodated within the can when compressed, thus preventing a short circuit from occurring between electrode plates.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A can, comprising:
    a bottom wall arranged opposite from an upper opening, wherein a pair of first grooves being arranged in the bottom wall, each at opposite ends of the bottom wall of the can and extending orthogonal to a longitudinal direction of the bottom wall, the can being adapted to accommodate an electrode assembly that includes a positive electrode plate, a negative electrode plate, a separator arranged between the positive and negative electrode plates and an electrolyte, the can being further adapted to accommodate insertion of the electrode assembly into the can via the upper opening, the can being comprised of metal, the first grooves preventing the positive and negative electrode plates of the electrode assembly from shorting together upon the can being subjected to a longitudinal compressive force by providing for symmetrical deformation of the can upon said longitudinal compressive force, the bottom wall having a first thickness external to the first grooves and a second and lesser thickness within the first grooves, the first thickness being within the range of about 0.2 to 0.7 mm and the second thickness being greater than 75% of the first thickness, the first grooves each having a width of less than 1 mm, each first groove having a length of at least 25% of a length of a lateral side of the bottom wall and the length of each first groove is smaller than the length of the lateral side of the bottom wall.

2. The can of claim 1, the can further comprising a pair of long-sidewalls and a pair of short-sidewalls arranged between the bottom wall and the upper opening, the can being of a box shape.

3. The can of claim 2, wherein the can comprises a plurality of walls that are integral with each other, each of the short-sidewalls and the long-sidewalls has a thickness in the range of about 0.2 to 0.4 mm.

4. The can of claim 3, further comprising a second groove longitudinally arranged at a center portion of one of the long-sidewalls, the second groove extending in a direction that is orthogonal to that of the first groove.

5. The can of claim 4, wherein the second groove has a bar shape.

6. The can of claim 4, wherein the second groove has a cross sectional shape selected from the group consisting of an arcuate shape and a triangular shape.

7. The can of claim 4, wherein the second groove has a length of at least 50% of a height of a long-sidewall that the second groove is arranged in.

8. The can of claim 4, wherein the second groove has a width of less than 3 mm.

9. The can of claim 8, wherein the width of the second groove is less than 1 mm.

10. The can of claim 4, wherein the second groove has a depth less than 25% of a thickness of a long-sidewall that the second groove is arranged in.

11. The can of claim 10, wherein the depth of the second groove is less than 10% of the thickness of the long-sidewall that the second groove is arranged in.

12. The can of claim 1, the can further comprising a pair of long-sidewalls and a pair of short-sidewalls arranged between the bottom wall and the upper opening, wherein the short-sidewalls of the can are curved, the short-sidewalls, the long-sidewalls and the bottom wall being integrally produced by a deep drawing process, the can having an oval cross section.

13. The can of claim 1, the can being comprised of a material selected from a group consisting of aluminum and aluminum alloy.

14. The can of claim 13, wherein each first groove has a cross section selected from the group consisting of rectangular and triangular.

15. The can of claim 1, wherein an edge portion of each first groove is curved.

16. The can of claim 1, wherein the second thickness is greater than 90% of the first thickness.

17. The can of claim 1, wherein the depth of each first groove is less than 10% of the thickness of the bottom wall.

18. The can of claim 1, wherein each first groove is arranged in an inner surface of the bottom wall of the can that faces the electrode assembly.

19. The can of claim 1, wherein each first groove extends from one of a front end and a rear end of the bottom wall of the can and is recessed in an outer surface of the bottom wall of the can.

20. The can of claim 1, wherein the distance between each first groove and a closest lateral side of the bottom wall is within 10% of the length of the bottom wall.

21. A can, comprising:
a bottom wall arranged opposite from an upper opening, wherein a pair of first grooves being arranged in the bottom wall, each at opposite ends of the bottom wall of the can and extending orthogonal to a longitudinal direction of the bottom wall, the can being adapted to accommodate an electrode assembly that the electrode assembly includes a positive electrode plate, a negative electrode plate, a separator arranged between the positive and negative electrode plates and a liquid electrolyte, the can being further adapted to accommodate insertion of the electrode assembly into the can via the upper opening, the can further comprising a pair of long-sidewalls and a pair of short-sidewalls arranged between the bottom wall and the upper opening, the can being of a box shape, wherein each first groove is arranged in an inner surface of the can, the can being comprised of a metal, wherein a thickness of the bottom wall at a location that corresponds to the first grooves is greater than 75% but less than 100% of a thickness of a remainder of the bottom wall external to the first grooves, each first groove having a length of at least 25% of a length of a lateral side of the bottom wall and the length of each first groove is smaller than the length of the lateral side of the bottom wall.

22. The can of claim 21, wherein the bottom wall external to the first grooves has a thickness in the range of about 0.2 to 0.7 mm, and the short-sidewalls and the long-sidewalls have a thickness of about 0.2 to 0.4 mm.

23. The can of claim 21, wherein a distance between each first groove and a closest lateral side of the bottom wall is no more than 10% of a length of the bottom wall.

24. The can of claim 21, wherein each first groove being a recess in an inner surface of the bottom wall of the can that faces the upper opening, wherein an external surface of the bottom wall of the can that faces away from the upper opening is absent of any groove or recess.

25. A lithium secondary battery, comprising;
an electrode assembly including a winding of a stacked structure that includes a positive electrode plate, a negative electrode plate and a separator arranged between the positive and negative electrode plates;
an electrolyte;
a metallic can comprising a bottom wall arranged opposite from an upper opening, wherein a pair of first grooves being arranged in the bottom wall, each at opposite ends of the bottom wall of the can and extending orthogonal to a longitudinal direction of the bottom wall, the first grooves each having a width less than 1 mm, portions of the bottom wall that correspond to the first grooves having a thickness that is greater than 90% and less than 100% of a thickness of a remainder of the bottom wall, each first groove having a length of at least 25% of a length of a lateral side of the bottom wall and the length of each first groove is smaller than the length of the lateral side of the bottom wall, the can being adapted to accommodate the electrode assembly and the electrolyte, the can being further adapted to accommodate insertion of the electrode assembly into the can via the upper opening, the electrode assembly and the electrolyte being arranged within the can; and
a cap assembly assembled to the upper opening of the can to seal the electrolyte and the electrode assembly within the can.

26. The lithium secondary battery of claim 25, wherein the bottom wall having a thickness in the range of about 0.2 to 0.7 mm at locations external to the first grooves, the can being produced by a deep drawing process, the electrolyte being a liquid electrolyte.

27. The lithium secondary battery of claim 25, further comprising:
a long sidewall arranged between the bottom wall and the upper opening; and
a second groove arranged in the long sidewall and being longitudinally arranged at a center portion of the long-sidewall of the can, the second groove extending in a direction that is orthogonal to that of the first groove, the long-sidewall and the short-sidewall each having a thickness in the range of about 0.2 to 0.4 mm at locations external to the second groove, and portions of the long-sidewall that correspond to the second groove have a thickness between 75% and 100% of the thickness of the long-sidewall external to the second groove.

28. The lithium secondary battery of claim 27, wherein a length of the second groove being at least 50% a height of the long-sidewall.

29. A can, comprising:
a bottom wall arranged opposite from an upper opening, wherein an embossing portion is arranged in the bottom wall, the embossing portion protruding inward toward an inner portion of the can, the can being adapted to accommodate an electrode assembly that includes a positive electrode plate, a negative electrode plate, a separator arranged between the positive and negative electrode plates and an electrolyte, the can being further adapted to accommodate insertion of the electrode assembly into the can via the upper opening, the can being comprised of metal, wherein the embossing portion being a closed-loop shape in the bottom wall.

30. The can of claim 29, the can further comprising a pair of long-sidewalls and a pair of short-sidewalls arranged between the bottom wall and the upper opening, the can being of a box shape.

31. The can of claim 29, the can further comprising a pair of long-sidewalls and a pair of short-sidewalls arranged between the bottom wall and the upper opening, wherein the short-sidewalls of the can are curved, the can having an oval cross section.

32. The can of claim 29, wherein the embossing portion being one of a rectangular ring shape and an oval ring shape.

33. The can of claim 29, wherein the embossing portion is arranged within an area where a distance between the area and a closest lateral side of the bottom wall corresponds to no more than 25% of a length of a longitudinal sides of the bottom wall, and a distance between the area and a closest longitudinal side corresponds to no more than 25% of a length of the lateral sides of the bottom wall.

34. The can of claim 29, wherein the embossing portion protrudes by a height of between 0.1 to 0.5 mm above an upper surface of the bottom wall on the inner portion of the can.

35. The can of claim 34, wherein the height of the protrusion of the embossing portion in the inner portion of the can is larger than a thickness of the bottom wall.

36. A lithium secondary battery, comprising;
an electrode assembly including a winding of a structure that includes a positive electrode plate, a negative electrode plate and a separator arranged between the positive and negative electrode plates;
an electrolyte;
a can comprising a bottom wall arranged opposite from an upper opening, wherein pair of embossing portions are arranged in the bottom wall, each at opposite ends of the a bottom wall of the can, the can being adapted to accommodate the electrode assembly, the can being further adapted to accommodate insertion of the electrode assembly and the electrolyte into the can via the upper opening, each embossing portion protruding from an inner surface of the bottom wall inwards towards the electrode assembly, the can being comprised of a metal, wherein a thickness of the bottom wall of the can is in the range of about 0.2 to 0.7 mm, the embossing portions protecting the electrode assembly from shorting upon the can being subjected to a longitudinal compressional force by causing the bottom wall of the can to outwardly bend upon the can being subjected to said longitudinal compressional force, wherein each embossing portion protrudes toward an inner portion of the can by a height larger than 50% of the thickness of the bottom wall, wherein a distance between each embossing portion and a nearest lateral side of the bottom wall is no more than 25% of a length of a longitudinal side of the bottom wall, each embossing portion being arranged in an area corresponding to at least 50% of a length of the nearest lateral side of the bottom wall, and the area in which each embossing portion is arranged is smaller than the length of the lateral side of the bottom wall; and
a cap assembly assembled to the upper opening of the can to seal the electrolyte and the electrode assembly within the can.

37. The can of claim 36, wherein each embossing portion has a shape selected from the group consisting of a bar, conical and hemispherical.

38. The can of claim 36, wherein each embossing portion is spaced apart from a closest end of the bottom wall and is aligned to be parallel to the closest end of the bottom wall.

39. The can of claim 36, wherein a distance between one of the embossing portions and a closest end of the bottom wall is no more than 10% of a length of the bottom wall.

40. The can of claim 36, wherein the bottom wall includes a first and a second embossing portion spaced-apart from one another, each of the embossing portions comprises a plurality of embossings arranged in a line.

41. The lithium secondary battery of claim 36, wherein each embossing portion has a shape selected from the group consisting of a bar, conical and hemispherical, the electrolyte being a liquid electrolyte.

42. The lithium secondary battery of claim 36, wherein the bottom wall is bounded by a pair of short sidewalls opposite each other at the ends of the bottom wall and a pair of long sidewalls opposite each other at longitudinal sides of the bottom wall, wherein each of the embossing portions comprise a plurality of embossings arranged in a line, the first of the two embossing portions being parallel to and in a vicinity of one of the two ends, and the second embossing portion being parallel to and in a vicinity of the other of the two ends.

* * * * *